US007571569B2

(12) United States Patent
Hiramatsu et al.

(10) Patent No.: US 7,571,569 B2
(45) Date of Patent: Aug. 11, 2009

(54) GLASS RUN

(75) Inventors: Takayoshi Hiramatsu, Aichi-ken (JP);
Teruyuki Okajima, Aichi-ken (JP);
Satoshi Mio, Toyota (JP)

(73) Assignees: Toyoda Gosei Co., Ltd., Aichi-pref.
(JP); Toyota Jidosha Kabushiki Kaisha, Aichi-ken (JP)

( * ) Notice: Subject to any disclaimer, the term of this patent is extended or adjusted under 35 U.S.C. 154(b) by 457 days.

(21) Appl. No.: 11/455,928

(22) Filed: Jun. 20, 2006

(65) Prior Publication Data

US 2007/0006534 A1    Jan. 11, 2007

(30) Foreign Application Priority Data

Jun. 20, 2005    (JP)    ............... 2005-179084

(51) Int. Cl.
*E06B 7/19*    (2006.01)
(52) U.S. Cl. ........................ 49/479.1; 49/441
(58) Field of Classification Search ............... 49/440, 49/441, 475.1, 479.1
See application file for complete search history.

(56) References Cited

U.S. PATENT DOCUMENTS

| 4,010,573 | A | * | 3/1977 | Andrzejewski | ............. | 49/479.1 |
| 4,894,953 | A | | 1/1990 | Nozaki | | |
| 5,636,895 | A | * | 6/1997 | Ito et al. | .................. | 296/146.9 |
| 5,655,333 | A | * | 8/1997 | Yamashita | .................... | 49/441 |
| 6,386,619 | B1 | * | 5/2002 | Tsuchida | ................. | 296/146.9 |
| 6,493,992 | B2 | | 12/2002 | Goto | | |
| 6,723,414 | B2 | * | 4/2004 | Aritake et al. | ................ | 428/122 |
| 6,964,133 | B2 | * | 11/2005 | Aritake et al. | ............... | 49/479.1 |
| 7,294,386 | B2 | * | 11/2007 | Murase et al. | ................. | 428/99 |
| 2004/0161584 | A1 | | 8/2004 | Aritake et al. | | |

FOREIGN PATENT DOCUMENTS

| JP | U-H02-45820 | 3/1990 |
| JP | U-H04-31016 | 3/1992 |

(Continued)

OTHER PUBLICATIONS

Office Action dated Mar. 28, 2008 in corresponding Chinese Patent Application No. 200610086742.6 (and English translation).

(Continued)

*Primary Examiner*—Jerry Redman
(74) *Attorney, Agent, or Firm*—Posz Law Group, PLC

(57) ABSTRACT

A glass run is provided in which a main body of a glass run is provided with an exterior side wall, an interior side wall and a bottom wall, an interior holding lip to be locked in a recess on a door frame is provided on an external surface of each interior side wall of extruded portions of the glass run, while interior holding lips on the corner portions are formed in substantially an L-shape to be angled to match the corner portion such that a distal end of the interior holding lip continues to an interior holding lip on a vertical side portion whereas a distal end of the other interior holding lip continues to an interior holding lip on an upper side portion, and the rigidity of the interior holding lips on the corner portion is made smaller than the interior holding lips on the extruded portions.

2 Claims, 3 Drawing Sheets

FOREIGN PATENT DOCUMENTS

| | | |
|---|---|---|
| JP | A-04-306130 | 10/1992 |
| JP | A-04-368225 | 12/1992 |
| JP | A-09-142155 | 6/1997 |
| JP | A-2002-059744 | 2/2002 |
| JP | A-2002-067700 | 3/2002 |
| JP | A-2004-359237 | 12/2004 |

OTHER PUBLICATIONS

Office Action dated Dec. 11, 2008 in corresponding Japanese patent application No. 2005-179084 (and English translation).

* cited by examiner

GLASS RUN

BACKGROUND OF THE INVENTION

1. Field of the Invention

The present invention relates to a glass run which is mounted along an inner part of a door frame of a vehicle door and which has extruded portions which guide a window glass which moves up and down and corner portions.

2. Related Art

As shown in FIG. 5, a glass run 110 which guides a window glass moving up and down is mounted along an inner part of a door frame 2 of a vehicle door 1. A corner portion of the conventional glass run 110 is shown in FIG. 6. FIG. 6 is a perspective view of the corner portion of the glass run 110 which is to lie at a portion corresponding to a corner portion of the door frame 2 which is formed between an upper side portion and a rear vertical side portion of the door frame 2.

Conventionally, the glass run 110 is, as shown in FIG. 5, mounted in a channel 3 of the door frame 2 to form a seal between the window glass 5 and the door frame 2 as well as guide the window glass 5 when it moves up and down. Furthermore, as shown in FIG. 4, in the glass run 110, an extruded portion 111 which corresponds to the upper side portion of the door frame 2 and extruded portions 111 which correspond to front and rear vertical portions of the door frame 2, respectively, are connected together by corner portions 112 which are molded into shapes which matches the shapes of corner portions of the door frame 2.

In addition, a seal between the door 1 and the body is effected by a weatherstrip (not shown) mounted to extend along outer circumferences of a door panel and the door frame 2 and/or an opening weatherstrip (not shown) mounted on a flange of an opening in the body.

As shown in FIG. 6, a main body of the glass run 110 is provided with an exterior side wall 120, an interior side wall 130 and a bottom wall 140 which are formed into a shape having a substantially U-shaped cross section. An exterior seal lip 121 is provided in such a manner as to extend from the vicinity of a distal end of the exterior side wall 120 toward the inside of the substantially U-shaped cross section of the main body. In addition, an interior seal lip 131 is also provided on the interior side wall 130 in such a manner as to extend from the vicinity of a distal end thereof toward the inside of the substantially U-shaped cross section of the main body.

The exterior side wall 120, interior side wall 130 and bottom wall 140 of the main body of the glass run 110 are inserted into the channel 3 of the door frame 2, so that at least part of an external surface of each wall is brought into press contact with an inner surface of the channel 3 to hold the glass run 110.

The window glass 5 slides inside the main body of the glass run 110 which is formed into the substantially U-shape in cross section, and a distal portion of the window glass 5 is held in a sealed fashion on both sides thereof by the exterior seal lip 121 and the interior seal lip 131 (for example, refer to Japanese Patent No. 2531311).

In addition, in order to lock and hold the glass run 110 within the channel 3 when the glass run 110 is mounted in the channel 3, an interior holding lip 134 and an exterior holding lip 124 are formed on the interior side wall 130 and the exterior side wall 120, respectively, of the extruded portion of the glass run 110.

As this occurs, since the corner portion 112 of the glass run 110 is molded into substantially an L-shape as viewed from the front as a whole, when an interior holding lip 134 and an exterior holding lip 124 are formed on the corner portion 112 in the same way as done on the straight-like portion 111 in such a manner as to continue to the interior holding lip 134 and the exterior holding lip 124 of the extruded portion 111, respectively, the rigidity of the corner portion is increased, making it hard for the corner portion 112 to be mounted in a corner portion in the channel 3.

To cope with this, as shown in FIG. 6, on the corner portion, for example, a gap 137 is provided between the exterior holding lips 124a, 124b which lie to the upper side portion 2g side and the rear vertical side portion 2e side of the door frame 2, respectively, so as to increase the mounting property of the corner portion 112. In addition, a gap is provided similarly on the interior holding lip 134 (for example, refer to Japanese Utility Model Publications No. JP-U-02-45820 and JP-U-04-31016)

In this case, however, noise or the like intrudes into the passenger compartment through the gaps 137 formed in the corner portions 112 between the door frame 2 and the glass run 110 to thereby deteriorate the sealing property, as well as the noise insulation property. In particular, in the event that the interior side wall 130 is formed larger, the deterioration in sealing property becomes more prominent due to the relationship with assembling variation.

Consequently, in order to fill the gap, while it has been desired to provide a seal lip which continues to the extruded holding lips in the same shape, in the event that the filling seal lip is formed in the same shape as that of the extruded holding lips, the rigidity at the corner portion is increased, whereby the mounting property is deteriorated. In addition, in the event that the seal lip is simply reduced in thickness while maintaining the same shape as that of the holding lips, the sealing property becomes insufficient.

SUMMARY OF THE INVENTION

Then, an object of the invention is to provide a glass run which is easy to be mounted on the door frame and which exhibits superior sealing property and noise insulation property at a corner portion thereof.

With a view to solving the problem, according to a first aspect of the invention, there is provided a glass run adapted to be mounted in an inner part of a door frame of a vehicle door to guide a window glass when the window glass moves up and down, the glass run comprising:

first and second extruded portions formed by extrusion molding to be mounted on upper side and vertical side portions of the door frame; and a corner portion formed by injection molding so as to connect the first and second extruded portions with each other to be mounted on a corner of the door frame;

the corner portion of the glass run including:

an exterior side wall, an interior side wall and a bottom wall so as to form substantially a U-shaped cross section;

an exterior seal lip and an interior seal lip that are provided in the exterior side wall and the interior side wall respectively, extending toward an inside of the U-shaped cross section, so that the exterior seal lip and the interior seal lip seal an exterior surface and an interior surface of a distal portion of the door window glass respectively; and an interior holding lip provided on an external surface of the corner portion to be locked in a recess on the door frame, the interior holding lip being angled to match an angle of the corner portion and formed into an L-shape;

wherein a first end of the interior holding lip on the corner portion is continues to an interior holding lip on the first extruded portion and a second end of the interior holding lip on the corner portion continues to an interior holding lip on the second side portion, and a rigidity of the interior holding lip on the corner portion is made smaller than a rigidity of the interior holding lips on the first and second extruded portions.

According to the first aspect of the invention, the main body of the glass run is provided with the exterior side wall, the interior side wall and the bottom wall which are formed into the shape having the substantially U-shaped cross section, and the exterior seal lip and the interior seal lip are provided on the exterior side wall and the interior side wall, respectively, in such a manner as to extend inward of the main body having the substantially U-shaped cross section, so as to seal both the exterior surface and the interior surface of the distal portion of the window glass by the exterior seal lip and the interior seal lip.

Due to this, when the door is closed, a distal portion of the window glass can be accommodated inside the main body of the glass run which is formed into the shape having the substantially U-shaped cross section by the exterior side wall, the interior side wall and the bottom wall at the upper side portion of the door frame so as to ensure the holding of the window glass. In addition, as the window glass moves up and down, both the exterior seal lip and the interior seal lip are brought into abutment with the window glass so as to establish a seal between the door frame and the window glass by the exterior seal lip and the interior seal lip.

Since the holding lip adapted to be locked in the recess on the door frame to hold the glass run is provided on the external surface of each extruded portion of the glass run which are mounted on the vertical side portion and the upper side portion of the door frame, the glass run can be held against the interior wall and exterior wall of the door frame or widow molding by the holding lips assuredly.

On the corner portion of the glass run, the interior holding lip angled to match the angle of the corner portion and formed into the L-shape as viewed from the front is formed such that the end of the L-shape of the molded interior holding lip continues to the extruded interior holding lip on the vertical side portion whereas the other end of the L-shape continues to the extruded interior holding lip on the upper side portion. Since the interior holding lip so configured is formed, a gap exists neither on the interior holding lip nor between the glass run and the door frame at the corner portion thereby making it possible to increase the sealing property.

Since the rigidity of the molded interior holding lip on the corner portion is made smaller than the rigidity of the extruded interior holding lips on the extruded portions, the flexibility of the interior holding lip on the corner portion becomes high in the corner portion when the glass run is mounted on the door frame, and the interior holding lip lying at the upper side portion and the interior holding lip lying at the vertical side portion can bend without pulling each other when the glass run is mounted on the door frame, thereby making it possible to mount the glass run on the door frame easily. In addition, since the flexibility of the molded interior holding lip at the corner portion is high, even though there is formed a so-called undercut at the portion where the interior holding lip is provided when molding the corner portion, the corner portion can easily be removed from the mold by deforming the interior holding lip.

According to a second aspect of the invention, there is provided a glass run according to the first aspect of the invention, wherein a protruding distal position of the interior holding lip on the corner portion is formed at the same position as a protruding distal position of the interior holding lip on each extruded portion, a protruding proximal position of the interior holding lip on the corner portion is made different from that of the interior holding lip on each extruded portion so as to reduce a thickness of the holding lip on the corner portion to thereby reduce the rigidity thereof.

According to the second aspect of the invention, the protruding distal position of the interior holding lip on the corner portion is formed at the same position as the protruding distal position of the interior holding lip on each extruded portion, while the protruding proximal position of the interior holding lip of the corner portion is made different from that of the interior holding lip of each extruded portion so as to reduce the thickness of the holding lips at the corner portion to thereby reduce the rigidity thereof. Due to this, when attempting to mount the glass run on the door frame, since the rigidity at the corner portion is reduced, the mounting of the glass run is facilitated, and at the corner portion, the protruding distal positions of the interior holding lips become as high as each other, whereby when the interior holding lips are brought into abutment with the door frame, a uniform abutment is realized and no gap is produced between the interior holding lips and the door frame, thereby making it possible to secure the sealing property.

According to a third aspect of the invention, there is provided a glass run according to the first or second aspect of the invention, wherein an interior cover lip is provided so as to extend from a distal end of the interior side wall of the corner portion in substantially a direction in which the interior side wall extends so as to cover a side portion of a garnish mounted on the door frame.

According to the third aspect of the invention, even when the glass run mounting portions at the corner of the door frame and the glass run are formed in such a manner as to bend substantially at right angles and interior portions of the door frame and a corner of the garnish are formed into curved shapes with large curvatures whereby large gaps are produced between the door frame and the garnish at the corner, the glass run can cover the gap portions so produced between the door frame and the garnish at the corners, a better appearance being thereby provided.

According to a fourth aspect of the invention, there is provided a glass run according to any of the first to third aspects of the invention, wherein the interior holding lip on the corner portion is held in a recess formed on an interior side of the door frame when the glass run is mounted on the door frame.

According to the fourth aspect of the invention, not only the glass run can be held and joined to the door frame assuredly at the corner portion, but also the interior cover lip can be brought into abutment with the side portion of the garnish, thereby making it possible to increase the sealing property between the door frame and the glass run.

According to a fifth aspect of the invention, there is provided a glass run according to any of the first to fourth aspect of the invention, wherein the extruded portions are formed of an EPDM rubber or olefin-based thermoplastic elastomer, and the corner portion is formed from an olefin-based thermoplastic elastomer, both the materials of the corner portion and the extruded portions are of the similar characteristics.

According to the fifth aspect of the invention, a good adhesion property can be provided between the corner portion and each extruded portion. In addition, since both the materials are olefin-based materials, a good weathering resistance can be provided, and since both the materials can be ground, a product obtained therefrom can be recycled. Since the corner portion is formed from the olefin-based thermoplastic elastomer, no vulcanization is necessary, resulting in easy molding.

According to the invention, since the molded interior holding lip formed into substantially the L-shape as viewed from the front is formed on the corner portion and the end of the molded interior holding lip so formed is made to continue to the interior holding lips which lie to the vertical side portion and the upper side portion of the door frame, respectively, no gap is produced on the interior holding lip, and hence, the glass run can be brought into abutment with the door frame assuredly, thereby making it possible to increase the sealing property.

In addition, since the rigidity of the molded interior holding lips on the corner portion is made smaller than the rigidity of the interior holding lips on the extruded portions, when the glass run is attempted to be mounted on the door frame, the flexibility of the interior holding lip on the corner portion becomes high at the corner portion of the glass run, and hence, the glass run can easily be mounted on the door frame.

DETAILED DESCRIPTION OF THE PREFERRED EMBODIMENTS

An embodiment of the invention will be described based on FIGS. 1 to 5.

Figure 4:
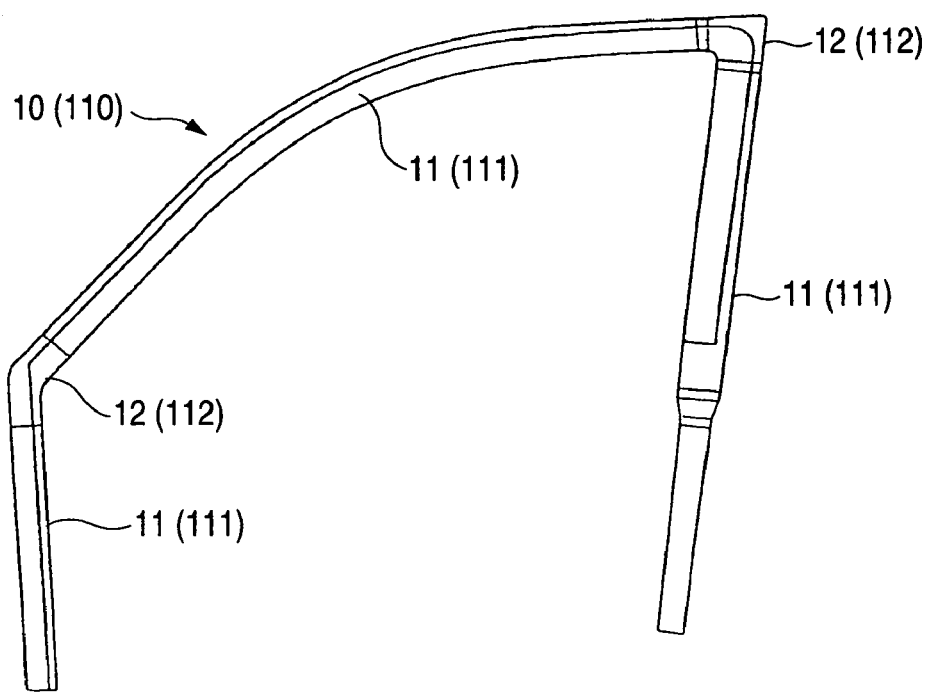
FIG. 4 is a front view of the glass run according to the embodiment of the invention.
Figure 5:
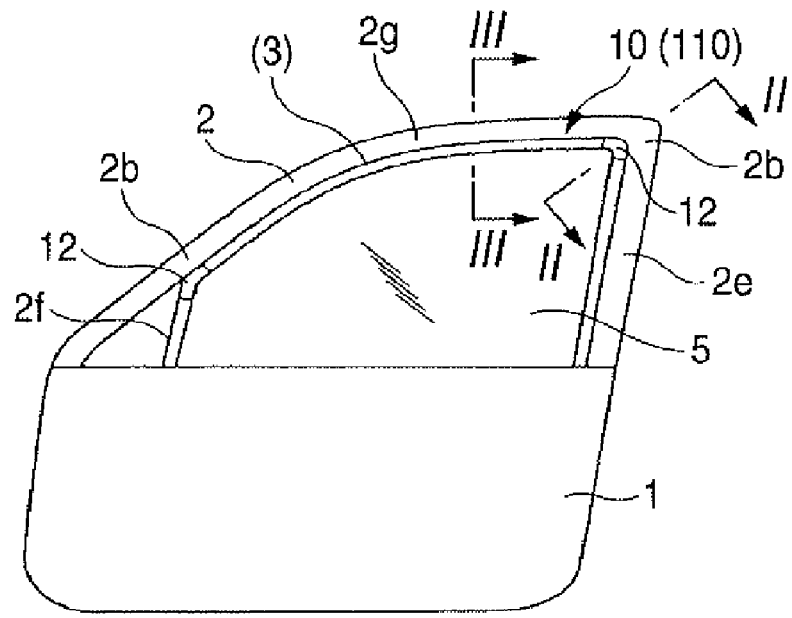
FIG. 5 is a front view of a vehicle door.
Figure 6:
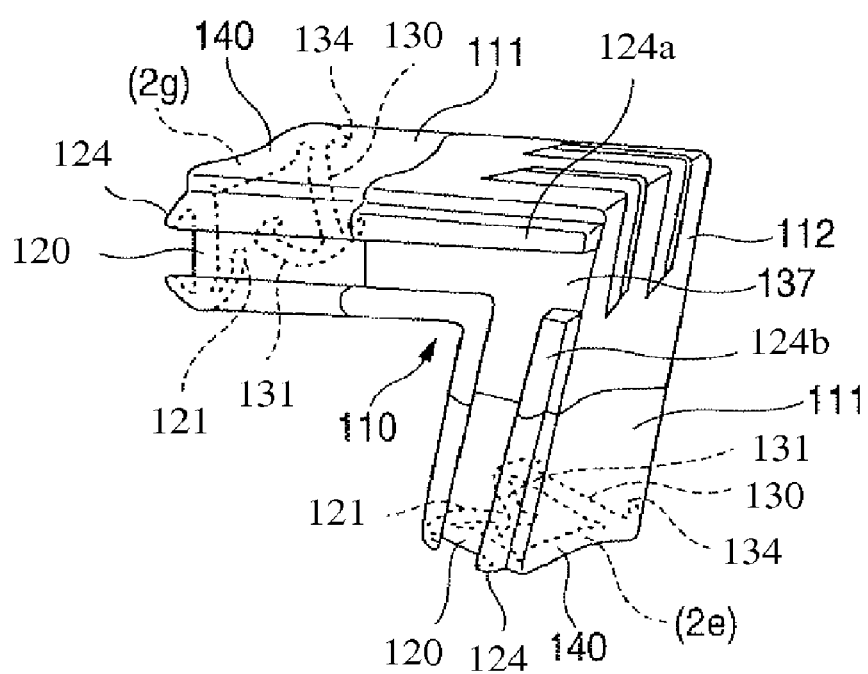
FIG. 6 is a partially cutaway perspective view of a corner of a conventional door frame.

FIG. 5 is a front view of a front side door 1 of a motor vehicle, and FIG. 4 is a front view of a front side door glass run 10 that is to be mounted on a door frame or a door frame, as a matter of fact, of the door 1. As shown in FIG. 5, the door frame 2 is provided at an upper portion of the door 1, and a window glass 5 is mounted in the door frame 2 in such a manner as to move up and down therein. Namely, the glass run 10 is mounted along an inner part of the door frame 2 so as to guide the window glass 5 moving up and down, as well as establish a seal between the window glass 5 and the door frame 2.

As shown in FIG. 4, the glass run 10 is, as a whole, provided with extruded portions 11 which are extruded and corner portions 12 which are molded to connect the extruded portions 11 together and are mounted on corner portions of the door frame 2.

The extruded portions 11 are a portion to be mounted on an upper side portion 2g of the door frame 2, a portion to be mounted on a rear vertical side portion 2e of the door frame 2 and a portion to be mounted on a division sash which constitutes a front vertical side portion 2f of the door frame 2, respectively.

To form these extruded portions into a shape corresponding to the door frame 2, the corner portions 12 are extruded to connect the extruded portions 11 together at front and rear corner portions, respectively. In addition, the corner portions 12 of the glass run 10 are mounted on the corner portions 2b of the door frame 2.

Taken as an example, the corner portion 12 of the glass run 10 which is mounted on the rear corner portion 2b of the front side door 1 formed by the rear vertical side portion 2e and the upper side portion 2g thereof will be described below.

Figure 1:
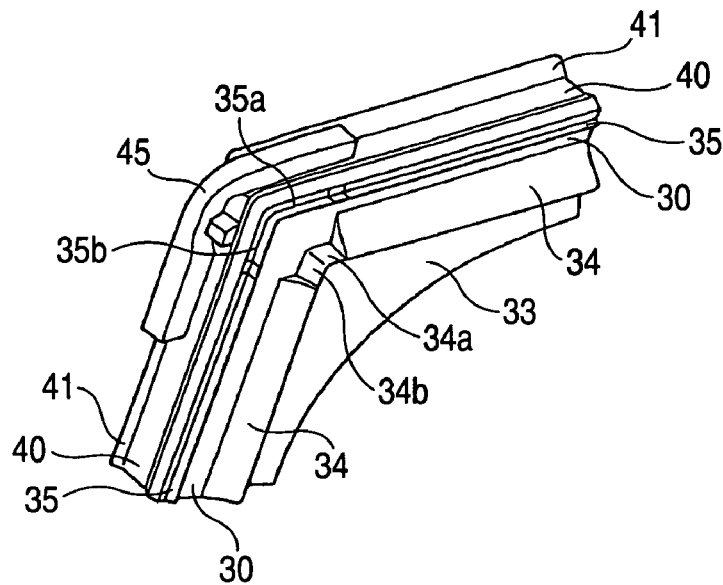
FIG. 1 is a perspective view of a corner portion of a glass run according to an embodiment of the invention.
Figure 2:
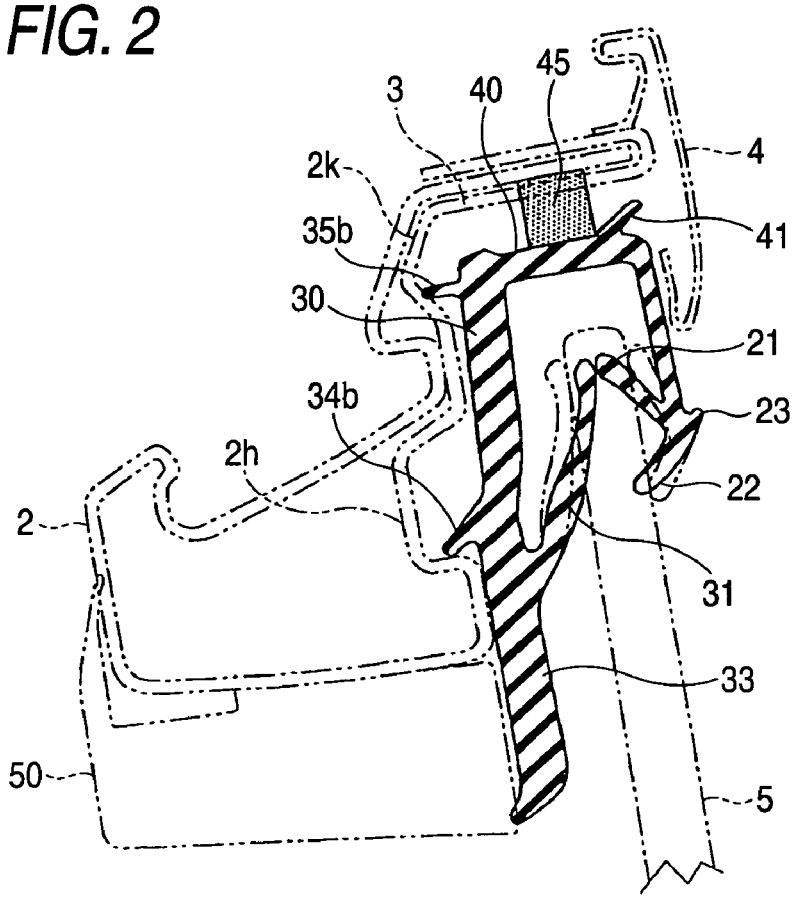
FIG. 2 is a sectional view showing a such a state that the glass run according to the embodiment of the invention is mounted on a corner of a door frame, which sectional view is taken along the line II-II in FIG. 5.

FIG. 1 is a perspective view of the rear corner portion 12 of the glass run, and FIG. 2 is a sectional view showing a such a state that the glass run 10 is mounted on the corner portion 2b of the door frame 2, which sectional view is taken along the line II-II in FIG. 5. Similarly, FIG. 3 is a sectional view showing a such a state that the glass run 10 is mounted on the upper side portion 2g of the door frame 2, which sectional view is taken along the line III-III in FIG. 5.

Figure 3:
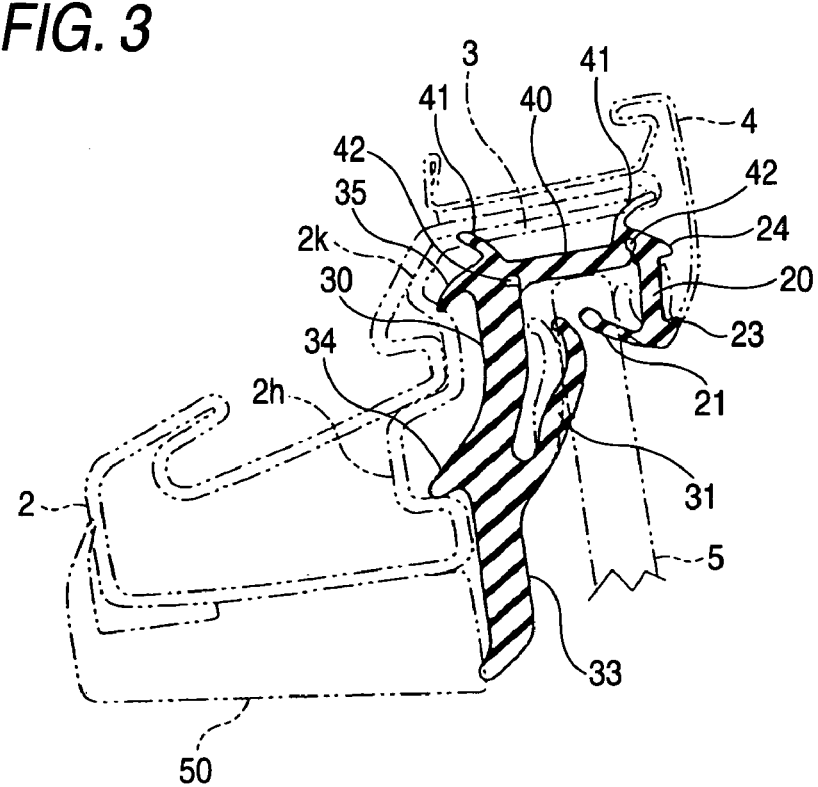
FIG. 3 is a sectional view showing a such a state that the glass run according to the embodiment of the invention is mounted on the corner of the door frame, which sectional view is taken along the line III-III in FIG. 5.

The cross section of a main body of the extruded portion 11 of the glass run 10 that is mounted on the upper side portion of the door frame 2 is, as shown in FIG. 3, formed into a substantially U-shaped cross section by an exterior side wall 20, an interior side wall 30 and a bottom wall 40. As will be described later on, the interior side wall 30 is formed larger and thicker than the exterior side wall 20, and the substantially U-shaped cross section is formed into an asymmetric cross section in which an interior side is made larger.

Basically, the main body of the glass run 10 has substantially the same substantially U-shaped cross section at not only the portion that is mounted on the upper side portion 2g of the door frame 2 but also the portions that are mounted on the vertical side portions 2e, 2f, 2h thereof.

The exterior side wall 20 of the glass run 10 is formed into substantially a plate shape in cross section.

An exterior seal lip 21 is provided in such a manner as to extend from the vicinity of a distal end of the exterior side wall 20 toward the inside of the substantially U-shaped cross section of the main body of the glass run. Additionally, an exterior cover lip 23 is provided in such a manner as to extend from a distal end of the exterior side wall toward the outside of the vehicle. The cover lip 23 covers a distal end of a door molding 4. The substantially U-shaped cross section is formed by the door molding 4 and the door frame 2, and the glass run 10 is held within the substantially U-shaped cross section so formed.

An exterior holding lip 24 is formed on an external surface of the exterior side wall 20 along a bottom wall 40 side thereof so that the door molding 4, which is secured to the door frame 2 at a side of a distal end thereof, is brought into abutment therewith at a side of the other distal end thereof which is angled.

In the embodiment of the invention, the door frame 2 does not have the conventional channel 3 having the substantially U-shaped cross section to hold the glass run 110 at the upper side portion 2g thereof, and hence, the glass run 10 is held in the portion formed into the shape having the substantially U-shaped cross section by the door frame 2 and the door molding 4 secured to the door frame 2.

As is described above, the exterior seal lip 21 is provided on an inside of the exterior side wall 20 in such a manner as to extend obliquely toward the inside of the main body of the glass run 10. When the window glass 5 moves up and an upper end thereof enters the inside of the upper side portion of the main body of the glass run 10, the exterior seal lip 21 and an interior seal lip 31, which will be described later on, are brought into elastic abutment with both interior and exterior sides of the upper end of the window glass 5, so as to establish a seal between the distal end of the window glass 5 and the door frame 2.

A low sliding-resistance member such as a urethane resin is applied to surfaces of the exterior seal lip 21 and the interior seal lip 31, which will be described later on, where the window glass 5 is brought into abutment. Due to this, when the window glass 5 slides within the glass run 10, the sliding resistance generated then can be reduced, thereby making it possible to prevent the deviation of the glass run as well as the generation of abnormal noise.

Furthermore, a low sliding-resistance member such as a silicone resin may be applied or affixed to an internal surface of the exterior side wall 20 and a rear surface of the exterior seal lip 21. In this case, even though the exterior seal lip 21 is pushed by the window glass 5 to thereby be joined to the exterior side wall 20, the sticking of the exterior seal lip 21 to the exterior side wall 20 can be prevented.

The bottom wall 40 is formed into substantially a plate shape, and groove portions 42 are formed, respectively, at continuous portions where the bottom wall 40 continues to the interior side wall 30 and the exterior side wall 20 so as to facilitate the bending of both the side walls. Bottom wall holding lips 41, 41 are formed on an external surface of the bottom wall 40 along both edges thereof in such a manner as to be brought into abutment with a bottom surface of a distal end portion of the door frame 2 so as to establish a seal between the door frame 2 and the glass run 10.

As with the seal lips 21, 31, a low sliding-resistance member such as a urethane resin is applied to an internal surface of the bottom wall 40 which constitutes the substantially U-shaped cross section of the main body of the glass run 10. Due to this, the sliding resistance against the window glass 5 can be reduced.

The interior side wall 30 is formed thicker and larger than the exterior side wall 20. Due to this, allowing the glass run 10 to be held on a side of the door frame 2, the interior side wall 30 can hold the glass run strongly and rigidly together with the door molding 4.

An interior cover lip 33 is provided in such a manner as to extend from a distal end of the interior side wall 30 in a direction in which the interior side wall 30 extends, that is, in parallel with a direction in which the window glass 5 moves up and down. This interior cover lip 33 is formed in such a manner as to cover a side portion of a garnish 50 mounted on a passenger compartment side of the door frame 2, whereby a portion between the door frame 2 and the side portion of the garnish 50 can be made to look better.

As with the exterior side wall 20, the interior seal lip 31 is provided in such a manner as to extend obliquely from the distal end of the interior side wall 30 toward the inside of the main body of the glass run 10. Since the interior seal lip 31 is formed longer and thicker than the exterior seal lip 21, the window glass 5 can be situated toward the outside of the vehicle when the window glass 5 enters the inside of the glass run 10, so as to reduce a difference in level between the door frame 2 and the window glass 5. Due to this, air resistance and wind noise can be reduced, and a preferred design can be provided.

On an external surface of the interior side wall 30, a first interior holding lip 34 is formed along a distal end, and a second interior holding lip 35 is formed along the vicinity of a continuous portion to the bottom wall 40. On an exterior side wall of the door frame 2, a first recess 2h is formed along a side thereof which lies to the garnish 50, and a second recess 2k is formed along a side thereof which lies to a portion where the bottom wall 40 is mounted. The first interior holding lip 34 is locked in the first recess 2h, and the second interior holding lip 35 is locked in the second recess 2k. Due to this, the glass run 10 can be held to the door frame 2 by the door molding 4, the first recess 2h and the recess 2k.

Next, the rear corner portion 12 of the glass run 10 will be described based on FIGS. 1 and 2.

The corner portion 12 of the glass run 10 is such as to collect the extruded portion 11 which constitutes an upper side portion and the extruded portion 11 which constitutes a rear vertical side portion of the glass run 10 when the corner portion 12 is molded. The cross section of the corner section 12 is substantially the same as the cross section of the extruded portion 11. Namely, a main body portion of the corner portion 12 is formed into substantially a U-shape in cross section by an exterior side wall 20, an interior side wall 30 and a bottom wall 40, and the upper side portion and the rear vertical side portion, which are different in cross section, are connected to each other at the corner portion where the difference in cross section is continuously changed.

Furthermore, an exterior seal lip 21 is provided in such a manner as to extend from the vicinity of a distal end of the exterior side wall 20 toward the inside of the substantially U-shaped cross section of the main body to match cross sections of the upper side portion and the rear vertical side portion. Furthermore, an exterior auxiliary seal lip 22 is provided on the distal end of the exterior side wall 20 in such a manner as to extend outward obliquely from an entrance of the main body. In addition, an exterior cover lip 23 is provided at the distal end of the exterior side wall 20 in such a manner as to extend toward the outside of the vehicle. A double sealing can be provided on an exterior side of the window glass 5 by the exterior seal lip 21 and the exterior auxiliary seal lip 22, the sealing property at the corner portion 12 being thereby increased.

An interior seal lip 31 is provided in such a manner as to extend from a distal end of the interior side wall 30 toward the inside of the substantially U-shaped cross section of the main body, and a interior cover lip 33 is provided in such a manner as to extend in a direction in which the interior side wall 30 extends, that is, in parallel with the direction in which the window glass 5 moves up and down. This interior cover lip 33 is formed in such a manner as to cover the side portion of the garnish 50 mounted on the interior side of the door frame 2, so as to cover a gap portion between the corner portion 2b of the door frame 2 and the corner portion 12 of the glass run 10 as done on the extruded portion.

As on the main body, the upper side portion and the rear vertical side portion, which are different in shape, are connected to each other by the seal lip and the cover lip on the corner portion at the corner portion where the difference in shape is continuously changed.

As on the extruded portion 11, first interior holding lips 34a, 34b and second interior holding lips 35a, 35b are formed on an external surface of the interior side wall 30 at the corner portion 12 of the glass run 110.

At the corner portion 12, compared to the first interior holding lip 34 on the extruded portion 11, the protruding distal position of the first interior holding lips 34a, 34b is formed at the same position as the protruding distal position of the interior holding lip 34 on the extruded portion 11, while the protruding proximal position of the first interior holding lips 34a, 34b is made different from that of the first interior holding lip 34, so as to reduce the thickness of the former holding lips to thereby reduce the rigidity thereof. In addition, reference numeral 34a denotes the first interior holding lip that is formed on a side of the corner portion which lies to the upper side portion, whereas reference numeral 34b denotes the first interior holding lip that is formed on the other side thereof which lies to the extruded portion. This relationship is also true with reference numerals 35a, 35b.

At the corner portion 12 of the glass run 10, the first interior holding lips 34a, 34b constitute an interior holding lip which is formed into substantially an L-shape, as viewed from the front, which extends along the corner portion 12. At the corner portion 12, a distal end of one part 34b of the substantial L-shape of the molded first interior holding lip is molded so as to continue integrally to the first interior holding lip 34 on the extruded portion. A distal end of the other part 34a of the substantial L-shape of the first interior holding lip is molded so as to continue integrally to the interior holding lip 34 on the upper side portion.

Since the first interior holding lips 34a, 34b are formed into substantially the L-shape at the corner portion 12 in such a manner as to be joined integrally and continuously to the first interior holding lips 34 on the vertical side portion and the upper side portion at the ends of the L-shape, respectively, there is produced no discontinuity or gap in the first interior holding lip 34 at the corner portion 12, thereby making it possible to increase the sealing property.

In addition, in order to ensure the connection to the extruded portion, a portion of the first interior holding lip on the corner portion 12 of the glass run 10 which connects to the extruded portion 11 may be formed partially as thick as the extruded portion and then be gradually reduced in thickness toward an angular portion at the corner portion so as to eventually constitute a thin portion.

Furthermore, since the rigidity of the first interior holding lips 34a, 34b on the corner portion 12 is formed smaller than the rigidity of the interior holding lip 34 on the extruded portion, when the glass run 10 is mounted on the door frame 2, the flexibility of the first interior holding lips 34a, 34b on the corner portion 12 is increased at the corner portion 12 of the glass run 10. In addition, the first interior holding lip 34 on the upper side portion and the first interior holding lip 34 on the rear vertical side portion can bend individually without pulling the other first interior holding lip 34 when they bend when the glass run 10 is mounted on the door frame 2 or the like, whereby the glass run 10 can easily be mounted on the door frame 2.

In addition, since the flexibility of the first interior holding lip 34 on the corner portion 12 is high, even though there is formed a so-called undercut at the portion where the interior holding lip 34 is provided when molding the corner portion, the interior holding lip 34 can be deformed easily so that the corner portion can easily be removed from the mold.

As with the first interior holding lips 34a, 34b, the second interior holding lips 35a, 35b on the corner portion 12 of the glass run 10 are molded integrally with the second interior holding lips 35 on the rear vertical side portion and the upper side portion and are held in the second recess 2k on the door frame 2 when the corner portion 12 is molded.

The bottom wall 40 of the corner portion 12 of the glass run 10 is molded integrally with the bottom walls 140 on the rear vertical side portion and the upper side portion when the corner portion 12 is molded. A caulking sponge 45 may be mounted on an external surface of the bottom wall 40 at the corner portion 12 so as to fill a gap between the door frame 2 and the bottom wall 40 to thereby increase the sealing property.

In forming the extruded portions 11 of the glass run 10, synthetic rubber, thermoplastic elastomer and non-rigid synthetic resin are used as a forming material, and EPDM rubber, polyolefin-based elastomer and non-rigid PVC are used in synthetic resin, thermoplastic rubber and non-rigid synthetic resin, respectively.

In the event of synthetic resin, an extruded portion 11 is transferred to a vulcanization tank to as to be heated by hot air or radiofrequency for vulcanization. In the event of thermoplastic elastomer and non-rigid synthetic resin, an extruded portion is cooled to set. Thereafter, the extruded portion is cut to a predetermined length, whereby the extruded portion is produced.

Next, in molding a molded portion of the corner portion 12 of the glass run 10, an extruded member produced in the manner described above is cut to predetermined dimensions, and end portions of the extruded members so cut are held in a mold used to mold a molded portion, a solid material which forms a molded portion is injected into a cavity in the mold. The cross section of a molded portion is substantially the same as the cross section of the extruded portion. The same type of material as that used for extrusion of the extruded portion is preferably used as a molding material. In the event of thermoplastic elastomer and non-rigid synthetic resin, since an injection material is molten when injected into the mold, the extruded portions and a portion to be molded are joined together by virtue of the heat and pressure of the molten injection material so injected.

In the event that the straight portions 11 of the glass run 10 are extruded from EPDM rubber or olefin-based thermoplastic elastomer, the corner portion 12 of the glass run 10 is preferably molded from olefin-based thermoplastic elastomer. In this event, the materials so used are of the same type, and hence, a good joining property between the extruded portions and the corner portion of the glass run can be provided. In addition, both the materials are olefin-based materials, and hence, they are superior in weathering resistance and at the same time can be ground, whereby a product can be obtained which is easily recycled. In the event of olefin-based thermoplastic elastomer, since no vulcanization is necessary, production can be facilitated.

In the event of synthetic resin, synthetic resin is injected into the mold and thereafter the mold is heated to vulcanize the synthetic resin so injected. As this occurs, since the same material or materials of the same type are used for the extruded portions and the molded portion, a vulcanization joining can be effected, so that the extruded portions and the molded portion can be integrally secured to each other.

What is claimed is:

1. A glass run adapted to be mounted in an inner part of a door frame of a vehicle door to guide a window glass when the window glass moves up and down, the glass run comprising:
   first and second extruded portions formed by extrusion molding to be mounted on upper side and vertical side portions of the door frame; and
   a corner portion formed by injection molding so as to connect the first and second extruded portions with each other to be mounted on a corner of the door frame;
   the corner portion of the glass run including:
   an exterior side wall, an interior side wall and a bottom wall so as to form substantially a U-shaped cross section;
   an exterior seal lip and an interior seal lip that are provided in the exterior side wall and the interior side wall respectively, extending toward an inside of the U-shaped cross section, so that the exterior seal lip and the interior seal lip seal an exterior surface and an interior surface of a distal portion of the window glass respectively; and
   an interior holding lip formed by injection molding and provided on an external surface of the corner portion to be locked in a recess on the door frame, wherein an interior cover lip is provided so as to extend from a distal end of the interior side wall of the corner portion in substantially a direction in which the interior side wall extends so as to cover a side potion of a garnish mounted on the door frame, and the interior holding lip is angled to match an angle of the corner portion and formed into an L-shape between the distal end of the interior side wall and interior side cover lip; wherein a first part of the interior holding lip on the corner portion continues to an interior holding lip on the first extruded portion and has a thickness substantially same as that of the interior side holding lip on the first extruded portion and a second part of the interior holding lip on the corner portion continues to an interior holding lip on the second side portion and has a thickness substantially same as that of the interior side holding lip formed in the second extruded portion, and wherein the interior holding lip on the corner portion further comprises a third part that is thinner than other parts and is located between the first part and the second part of the interior holding lip to form a corner such that a protruding distal portion of the interior holding lip of the third part is formed at the same position as a protruding distal portion of the interior holding lip on said first and second extruded portions, a rigidity of the interior holding lip on the corner portion is made smaller than a rigidity of the interior holding lips on the first and second extruded portions by forming the interior holding lip on the corner portion to be thin, such that the interior holding lip on the corner portion is held in the recess formed on an interior side of the door frame when the glass run is mounted on the door frame.

2. A glass run according to claim 1, wherein the extruded portions are formed of an EPDM rubber or olefin-based thermoplastic elastomer, and the corner portion is formed from an olefin-based thermoplastic elastomer.

\* \* \* \* \*